Jan. 22, 1935.  E. L. HARRY  1,988,792
DUAL PURPOSE WHEEL CONSTRUCTION
Filed July 16, 1932   2 Sheets-Sheet 1
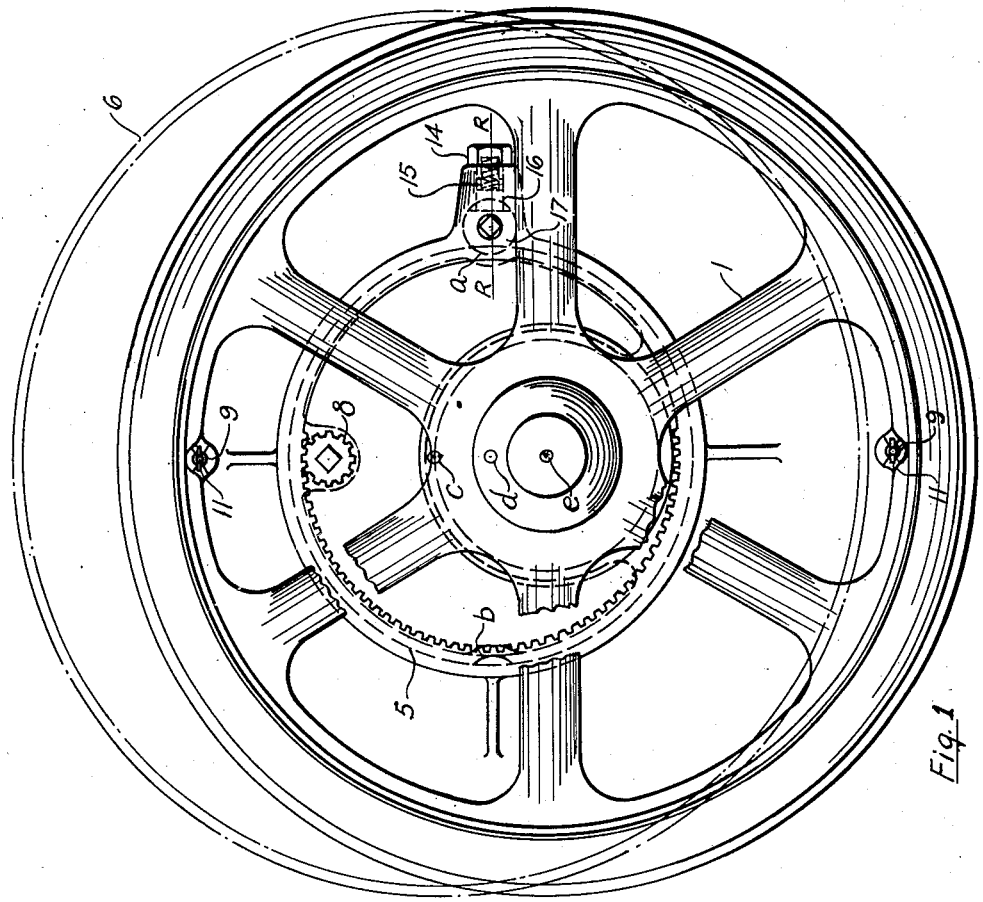
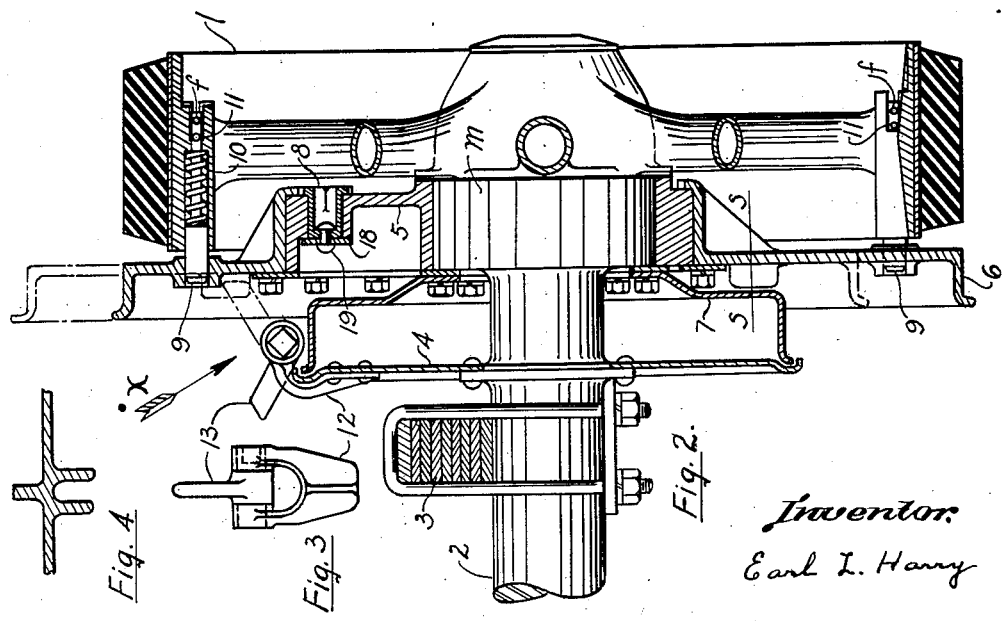
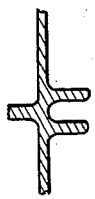
Inventor
Earl L. Harry Jan. 22, 1935.   E. L. HARRY   1,988,792
DUAL PURPOSE WHEEL CONSTRUCTION
Filed July 16, 1932   2 Sheets-Sheet 2
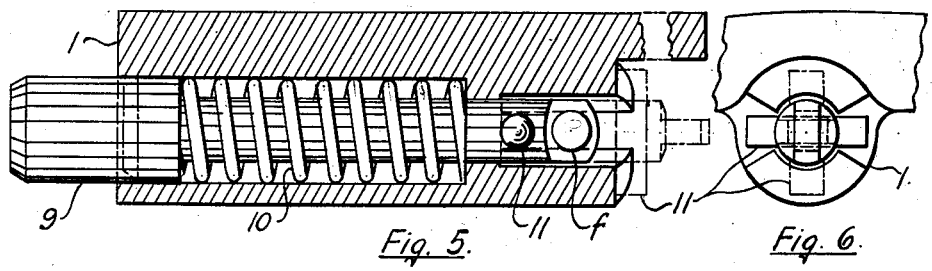
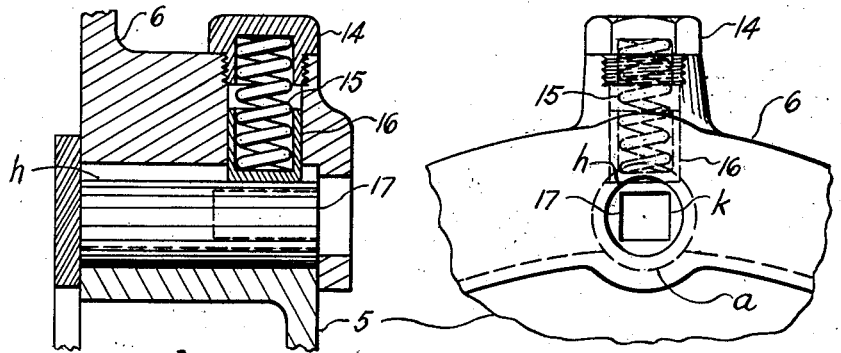
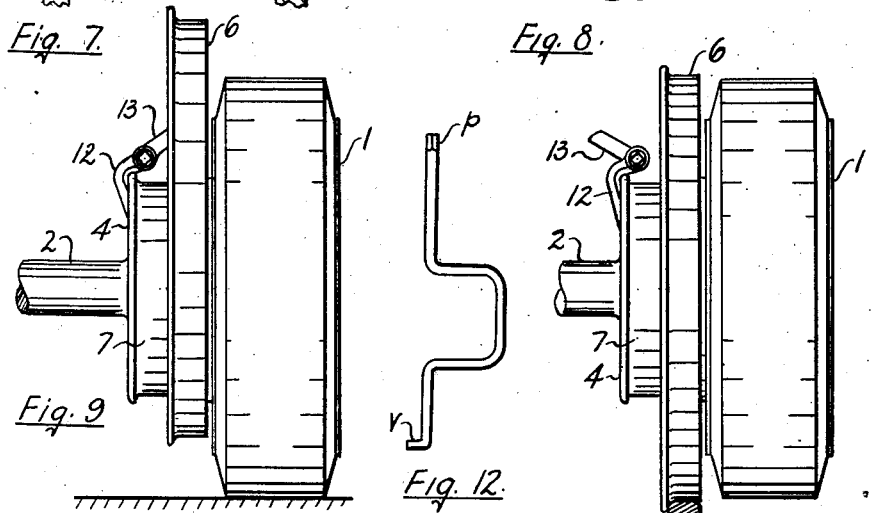
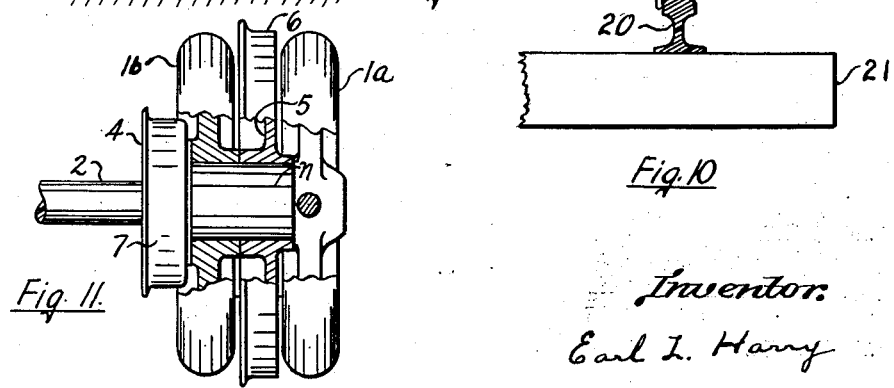
Inventor:
Earl L. Harry Patented Jan. 22, 1935

1,988,792

UNITED STATES PATENT OFFICE 1,988,792

DUAL PURPOSE WHEEL CONSTRUCTION

Earl L. Harry, Detroit, Mich.

Application July 16, 1932, Serial No. 622,882

9 Claims. (Cl. 295—8.5)

My invention relates to means for adapting an automotive vehicle or trailer to operate either on a public highway or on the rails of a railroad track. This object is attained by the use of a combination wheel construction in which the ordinary resiliently tired wheel is retained to make contact with the public highway, said wheel being also provided with a flanged metal tire adjustably mounted on said wheel to be used for engagement with the rails of a railroad track.

In the drawings accompanying this specification:—

Fig. 1 is a side elevation of the wheel mechanism.

Fig. 2 is mostly a cross sectional view taken at or near a vertical center line through Fig. 1.

Fig. 3 is a view of a locking finger and bracket and looking in the direction of the arrow X, Fig. 2.

Fig. 4 is a cross section through a portion of the flanged tire at line S—S, Fig. 2.

Fig. 5 is an enlarged cross sectional view of the means for locking the flanged tire to the road wheel.

Fig. 6 is a projected view of the parts shown in Fig. 5.

Fig. 7 is mostly a cross sectional view taken on or near the line R—R, of Fig. 1.

Fig. 8 is a projected view of the parts shown in Fig. 7.

Fig. 9 may be taken either as a forward or rearward view with the resilient tire in contact with the roadway.

Fig. 10 is a similar view to that of Fig. 9 but shows the flanged tire in contact with the rail of a railroad track.

Fig. 11 shows a method for placing the flanged tire between two resilient tires.

Fig. 12 shows a tool to be used for the adjustment of and for locking and unlocking the parts in their various positions.

By further reference to the drawings I will now describe in more detail the embodiments of my invention therein shown.

In Fig. 1 and Fig. 2, 1 is a highway road wheel with a resilient tire mounted thereon, said road wheel being journaled to the axle 2 by the usual anti-friction bearings in the usual manner. 3 is the usual spring as commonly attached to the axle 2. 4 is a standard brake anchor plate secured to the axle 2. The wheel 1 has been somewhat altered from that of the conventional type in that a cylindrical bearing surface has been turned on the exterior portion of the hub of said wheel upon which an eccentric 5 is rotatably mounted. The center of the inner periphery of the eccentric 5 is of course common with that of the wheel 1 and is located at $e$, Fig. 1, while the center of the outer periphery is located at $d$. The tire 6 is of the flanged type adapted to run on rails of a railroad track and is rotatably mounted on the outer periphery of the eccentric 5. 7 is a standard brake drum securely bolted to the wheel 1 by the bolts shown near the center of the drum, said bolts passing through the drum and into the hub $m$ of the wheel 1. 8 is a small pinion and is rotatably mounted in the eccentric 5 and is held in position by the rivet 19 and the washer 18. Gear teeth on the pinion mesh with like teeth on the tire 6. 9 is a plunger set in the wheel 1 and engages with the tire 6. The plunger is held in position by the spring 10 and pin 11, parts 9, 10 and 11 being more clearly shown in Fig. 5 and Fig. 6, and is used for locking the tire 6 to the wheel 1. 12 is a bracket fixed to the anchor plate 4. 13 is a finger mounted on the bracket 12 to rotate through a limited arc and engage with the notch in the tire 6 shown in Fig. 4, thus locking the tire 6 in an eccentric and stationary position relative to the wheel 1. 14 is a spring retainer nut and 15 is a spring exerting a considerable force against a plunger 16 which in turn is forced against a flat side $h$ of the locking cylinder 17. These parts 14, 15, 16 and 17 are shown more clearly in Fig. 7 and Fig. 8, where it will be noted that the locking cylinder 17 engages a notch $a$ and locks the eccentric 5 to the tire 6 and further that if the cylinder 17 be rotated through 180 degrees of arc the flat $h$ will coincide with the notch $a$ and the eccentric 5 will be free to rotate with respect to the tire 6.

Fig. 9 shows the wheel 1 and the tire 6 properly adjusted for operation on a common highway while in Fig. 10 the wheel 1 and tire 6 are shown properly adjusted for operating on a railroad track, the tire 6 being in contact with the rail 20.

Realizing that it may be desirable at times to place the flanged tire directly between two highway road wheels in order to keep the tread of the vehicle within reasonable limits I have shown in Fig. 11 the wheel 1a with the hub $n$ as an integral part thereof, the eccentric 5 mounted exactly the same as in Fig. 2 while the wheel 1b is also rotatably mounted on the hub $n$ of the wheel 1a. As before the brake drum is secured to the hub $n$ and all other parts are identical as described above.

Considering now the operations and functions of the various parts embodied in my invention, let it be assumed that the wheel mechanism is adjusted for operation on a railroad track and it is desired to readjust for operation on a common highway. In Fig. 1, Fig. 2, and Fig. 10 I have shown the wheel mechanism in proper adjustment for operation on a railroad track. It will be noted that in these views the two tires are concentric and are of the same outer diameter, it being necessary for the outer diameter of the flanged tire to be as great or greater than that of the resilient tire in order to prevent interference between the resilient tire and switch rails, pavement and other objects ordinarily constructed adjacent to and approximately on a level with the rails of a railroad track. Before the above mentioned readjustment can be made it will be necessary to transfer the weight of the vehicle and load from the flanged tire to that of the resilient tire which is accomplished by moving the vehicle upon which the wheel is mounted onto a raised portion of pavement or other ramp like structure which has been constructed adjacent to the rails of the railroad track, whereby the resilient tire becomes the supporting member and the flanged tire is lifted clear of the rails and is free to be adjusted. As previously pointed out the flanged tire is concentrically locked to the wheel 1 by means of the pins 9. By use of the tool shown in Fig. 12 or other similar means the pin 9 can be withdrawn to the dash and dot position as shown in Fig. 5 and Fig. 6 whereby the tire 6 and eccentric 5 are free to rotate upon the hub $m$. The end $v$ of the tool is inserted in the hole $f$ in the pin 9 where, by the exertion of a reasonable force outwardly the resistance of the spring 10 is overcome causing the pin 9 to slide outwardly and clear of the tire 6, then by rotating the pin 9 on its longitudinal axis through approximately 180 degrees of arc the pin 11 will rest on the ledge as shown in Fig. 5 and Fig. 6 by the dash and dot position and thereby prevent the spring from returning the pin 9 to its former position. By inserting the square end $p$ of the provided tool in the square hole $k$ in the cylinder 17 and exerting an angular force through approximately 180 degrees of arc the locking cylinder 17 will be rotated through a like angular motion whence the flat surface $h$ will coincide with the groove $a$ and the flanged tire 6 will be free to rotate upon the eccentric 5.

It will be now evident that if the tire 6 be rotated through 180 degrees of arc on the eccentric 5 the center of the outer periphery will be changed from the location $e$ to the location $c$ and the entire tire 6 will be raised through the vertical distance from $e$ to $c$ to the position shown by the dash and dot lines. It will of course be seen that this angular motion of the tire 6 can be accomplished by inserting the square end of the provided tool in the square hole in the pinion 8, whence by exerting an angular force thereon the pinion 8 will rotate as will also the tire 6 meshing with it through the gear teeth shown. With the movement of the tire 6 to the position shown by the dash and dot lines the notch or groove shown in Fig. 4 was thereby moved to a position adjacent to and in direct alignment with the finger 13. By inserting the square end of the tool in the square hole shown in the finger 13 the end of said finger may be rotated into the groove as shown by the dash and dot lines thus locking the flanged tire in its raised position. It will also be evident that during the semi-circular rotation of the tire 6 the parts 14, 15, 16 and 17 have moved to a position coinciding with the notch $b$ in the eccentric 5, whence by the use of the provided tool a semi-circular movement of the part 17 can be made to lock the tire 6 again into fixed relation with the eccentric 5.

With the above described adjustment accomplished the vehicle is now ready for operation upon a common highway as shown in Fig. 9. It is well here to point out that during the operation of travel on the common highway the tire 6, eccentric 5 and all other parts affixed thereto are entirely stationary with respect to the axle 2 while the road wheel 1 and parts affixed thereto have a rotating movement with respect to said axle. It will also be evident that during the operation of travel on a railroad track the wheel 1, tire 6 eccentric 5 and all parts affixed thereto will rotate simultaneously.

Since the method of wheel adjustment is substantially the reverse of that described above when it is desired to change the operation of the vehicle from a common highway to a railroad track a complete description thereof would be unnecessary and superfluous; however, the following steps would be followed. Place the vehicle on a raised ramp construction with the highway wheels supporting the vehicle, the flanged wheels directly above the rails of the railroad track. Unlock the flanged tire from its anchorage to the brake drum. Unlock the flanged tire from the eccentric. Rotate the flanged tire into concentric relationship with the resilient tire. Lock the resiliently tired wheel into said concentric relation. Move vehicle forwardly and downwardly whereby the flanged tire will come into contact with the rails.

From the above description it will be evident that the wheel construction may be used as a driving and supporting member, as a supporting member only or as a steering and supporting member while operating either on a common highway or on a railroad track, and that consequently said wheel construction may be mounted on the driving axle of an automotive vehicle, on the front or steering axle of an automotive vehicle or on either the forward or rearward axle of a trailer.

Having thus described my invention, what I claim and desire to secure by Letters Patent is:

1. A wheel, provided with a resilient tire for highway operation, provided with a flanged tire for railway operation, said flanged tire being adjustable to concentric relation with the resilient tire in which position both tires will rotate simultaneously during railway operation, said flanged tire being adjustable to eccentric relation with the resilient tire in which position the flanged tire will be non-rotative and clear of the highway for highway operation; a brake anchor plate secured to the axle upon which said wheel is mounted, means for attaching the flanged tire to the brake anchor plate whereby the flanged tire can be retained in said eccentric and non-rotative position for highway operation; a brake drum secured to said wheel, means for locking the flanged tire into concentric relation with the resilient tire whereby the same set of brakes can be used for either highway or railway operation.

2. A wheel provided with a resilient tire for highway operation, provided with a flanged tire for railroad operation, said flanged tire being adjustable to concentric relation with the resilient tire in which position both tires will rotate simultaneously during railroad operation, said flanged tire being adjustable to eccentric relation with the resilient tire in which position the flanged tire will be non-rotative and clear of the highway for highway operation; a stationary member mounted on the axle structure supporting said wheels, means for locking the flanged tire to said stationary member whereby the flanged tire can be retained in said eccentric and non-rotative position for highway operation.

3. A convertible wheel structure consisting of one flanged wheel for railroad operation and at least one resiliently tired wheel for highway operation, an axle supporting said wheel structure and a brake drum rotatably, and supporting a stationary member functioning as a brake anchor, means for locking said wheels together in concentric relation for railroad operation whereby the railroad wheel and the highway wheel will be connected to the same brake drum, and means for locking the railroad wheel to said stationary member in a stationary and eccentric relation to the highway wheel for highway operation.

4. A convertible wheel structure consisting of at least one wheel resiliently tired for highway operation and one wheel with a flanged rim for railway operation, an eccentric revolvably mounted on a cylindrical extension of the hub of said resilient wheel, a brake drum secured to said cylindrical extension, a brake anchor plate mounted fixedly adjacent said brake drum, said flanged wheel being mounted on said eccentric between said resilient wheel and said brake drum, means for revolving said flanged wheel on and about said eccentric whereby said flanged wheel will be adjustable to a position concentric with said resilient wheel for railroad operation or to a raised position eccentric with said resilient wheel for highway operation, and means for locking said flanged wheel in the concentric position with the resilient wheel whereby it will be connected to said brake drum, and means for locking said flanged wheel in said eccentric position to said brake anchor plate whereby it will be retained stationary during highway operation.

5. A convertible wheel structure consisting of at least one wheel resiliently tired for highway operation and one wheel with a flanged rim for railroad operation, an eccentric revolvably mounted on a cylindrical extension of the hub of said resiliently tired wheel, said flanged wheel being mounted on said eccentric, means for revolving said flanged wheel on and about said eccentric into a concentric relation with resilient tired wheel for railroad operation or into an eccentric relation therewith for highway operation, said means comprising a gear integral with said flanged rimmed wheel and co-axial with the outer periphery of said eccentric, and a pinion mounted on said eccentric and engaging said gear whereby by rotating said pinion said flanged wheel will be rotated around said eccentric.

6. A convertible wheel structure consisting of at least one wheel resiliently tired for highway operation and one wheel flanged for railroad operation, an eccentric mounted revolvably on a cylindrical extension of the hub of said resiliently tired wheel, said flanged wheel being mounted on said eccentric, a stationary brake anchor plate mounted on the supporting axle of said wheel structure, a gear integral with said flanged wheel and co-axial with the outer periphery of said eccentric, a pinion on said eccentric engaging said gear whereby by the rotation of said pinion said flanged wheel will be revolved around said eccentric into a position concentric or eccentric with said resilient tired wheel for railroad or highway operation respectively, and means for locking said flanged wheel to said resiliently tired wheel in their concentric relation, and means for locking said flanged wheel to said stationary brake anchor plate in the eccentric relation of said wheels.

7. A convertible wheel structure consisting of at least one wheel resiliently tired for highway operation and one wheel flanged for railroad operation, an axle supporting said wheel structure rotatably mounted at the end thereof, a stationary brake anchor plate mounted on said axle, a brake drum, said resiliently tired wheel having a cylindrical hub extension toward said brake anchor plate, said brake drum being secured to said cylindrical extension facing said brake anchor plate, an eccentric mounted rotatably on said cylindrical extension between said resiliently tired wheel and said brake drum, said flanged wheel being mounted rotatably on said eccentric, means for revolving said flanged wheel around said eccentric into either a concentric or eccentric relation to said resilient tired wheel for highway or railway operation respectively, means for locking the flanged wheel to the eccentric in either of the relative positions thereof, means for locking said flanged wheel to said resiliently tired wheel in their concentric relation whereby said brake drum can be used both in highway and railroad operation, means for locking said flanged wheel to said anchor plate in the eccentric relation thereof to said resiliently tired wheel.

8. A vehicle wheel structure rotatably mounted on a supporting axle and consisting of at least one wheel resiliently tired for highway operation and one flanged wheel for railroad operation, an eccentric mounted revolvably on a cylindrical extension of the hub of said resiliently tired wheel, said flanged wheel being mounted on said eccentric, a gear integral with said flanged wheel and co-axial with the outer periphery of said eccentric, a pinion on said eccentric engaging said gear whereby by the rotation of said pinion said flanged wheel will be revolved around said eccentric into a position concentric or eccentric with said resiliently tired wheel for railway or highway operation respectively, and means for locking said flanged wheel to said resiliently tired wheel in their concentric relation, and means for locking the flanged wheel in said eccentric position to a non-rotative portion of the axle supporting said wheels.

9. A convertible wheel structure rotatably mounted on a supporting axle and having at least one wheel resiliently tired for highway operation and one wheel with a flanged rim for railway operation, means for lowering or raising said flanged wheel in relation to said resiliently tired wheel whereby the weight of the vehicle upon which said wheel structure is mounted will be transferred from said resiliently tired wheel to the flanged wheel or vice versa, means for joining said flanged wheel concentrically to said resiliently tired wheel when in the lowered position for railroad operation, a stationary member mounted adjacent to said wheels and on the axle upon which said wheel structure is mounted and means for locking said flanged wheel to said stationary member when in the raised position for operation on the highway.

EARL L. HARRY.